Jan. 17, 1950 J. V. WECKBAUGH 2,494,599

MEANS FOR PHOTOGRAPHICALLY PRODUCING A PLURALITY OF ASSEMBLAGES OF PRESELECTED DATA

Filed July 27, 1946 4 Sheets-Sheet 1

INVENTOR.
JOSEPH V. WECKBAUGH
BY
Fred'k H. Schuetz
ATTORNEY.

Jan. 17, 1950 J. V. WECKBAUGH 2,494,599

MEANS FOR PHOTOGRAPHICALLY PRODUCING A PLURALITY OF ASSEMBLAGES OF PRESELECTED DATA

Filed July 27, 1946 4 Sheets-Sheet 2

INVENTOR.

JOSEPH V. WECKBAUGH.

BY Fred'k Schuetz

ATTORNEY.

FIG. 9.
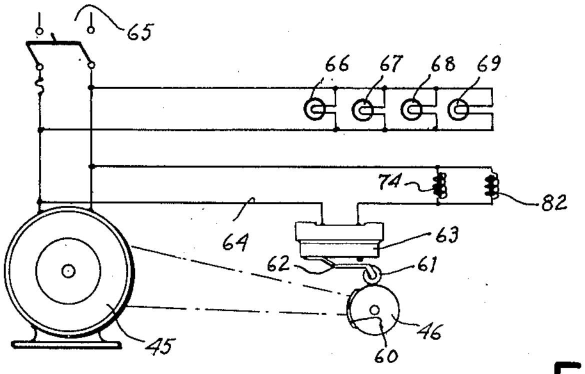
FIG. 8.
FIG. 7.
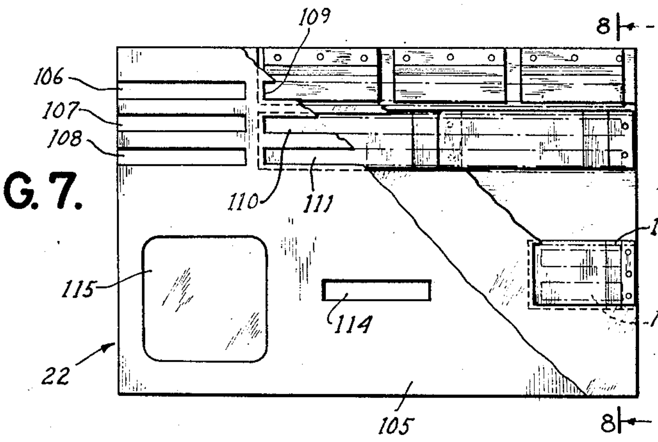
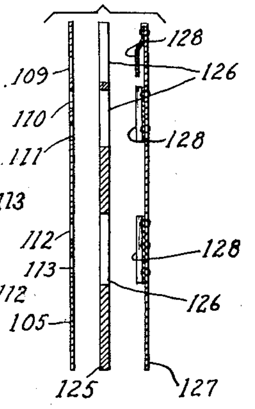
FIG. 8a.
FIG. 6.
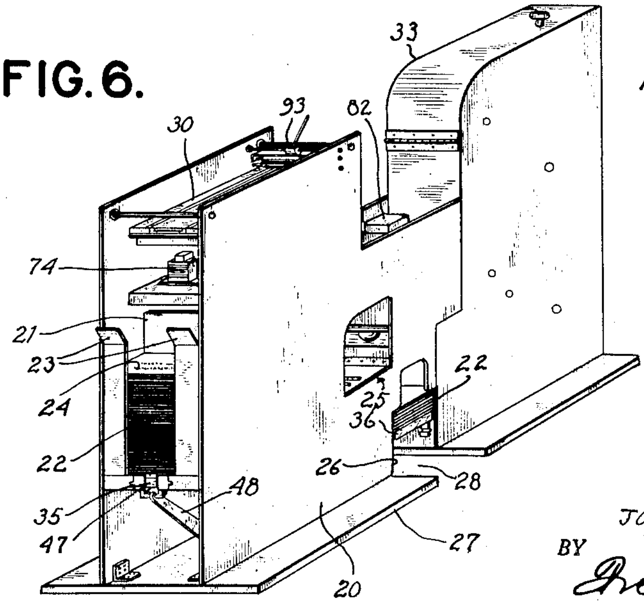
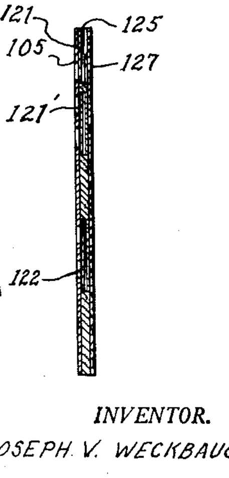
INVENTOR.
JOSEPH V. WECKBAUGH.
BY
Fred'k [signature]
ATTORNEY.

Jan. 17, 1950 J. V. WECKBAUGH 2,494,599

MEANS FOR PHOTOGRAPHICALLY PRODUCING A PLURALITY OF ASSEMBLAGES OF PRESELECTED DATA

Filed July 27, 1946 4 Sheets-Sheet 4

INVENTOR.

JOSEPH V. WECKBAUGH

BY Fred'k F. Schuetz

ATTORNEY.

Patented Jan. 17, 1950

2,494,599

UNITED STATES PATENT OFFICE 2,494,599

MEANS FOR PHOTOGRAPHICALLY PRODUCING A PLURALITY OF ASSEMBLAGES OF PRESELECTED DATA

Joseph V. Weckbaugh, Greenwich, Conn.

Application July 27, 1946, Serial No. 686,662

6 Claims. (Cl. 88—24)

The invention relates to data recording apparatus, for example, accounting and check producing apparatus designed to afford on different portions of a sensitized strip separate and distributed data and to prepare, of a further sensitized strip, documents such as checks relating to said distributed data and accompanied by suitable identification data.

The invention has for an object to provide a novel composite strip affording a succession of documents such as checks with associated vouchers or stubs which are longitudinally perforated, or otherwise made conveniently separable, the portion on one side of the separation bearing, for example, accounting data for the information of the payee and detachable, and the remaining portion constituting then a bankable check and bearing, also data suitable for identification of the payee.

A further object of the invention is to provide suitable apparatus whereby to prepare automatically a document such as a check and associated data.

A still further object of the invention is to provide apparatus for properly and selectively photographing the required data upon a continuous sensitized strip, in the case of the production of bankable checks, not only as to the final and individual check items but also with respect to selected portions of the data upon corresponding portions of the sensitized strip.

The invention has for another object to provide an apparatus for securing, from previously prepared data slips or inserts, the final documents with stubs or vouchers, as well as accounting strips; also, to provide a novel jacket element for conveying the data-bearing slips through the apparatus.

The invention has for an object, also, to provide a novel film retaining frame or pack for conveniently presenting different portions of a sensitized strip simultaneously for exposure and for permitting consecutive advance of the film portions.

In carrying out the invention, the desired data, for subsequent use and filing as well as for inclusion with, for example, a payee's check and voucher, is prepared on a suitable medium such as a slip of paper preliminarily to introduction into the apparatus, said slips to this end being designed to be inserted within corresponding predetermined pockets of individual jacket members which are used in conveying the data through the apparatus. The said jacket members are loaded into a stack at one end of the apparatus, and consecutive jacket members are fed from the bottom of the stack longitudinally forward in a common plane and advanced intermittently into and through a plurality of photographic fields. During the intervals of rest in the respective fields simultaneous exposures are made, upon a common sensitized strip, of a predetermined number of the jacket members or, rather, the data presented by the slips retained by the respective jacket members; and such data is individualizd and distributed on the strip as may be desired. Following the simultaneous group photography, individual collocating photographs are made on a further sensitized strip, as an individual jacket member located in a further and advanced position, and under a suitable masking member, for the purpose of preparing the desired document such as, for example, a check and voucher bearing collocated jacket data and matter from the masking member. The jacket members are then discharged individually into a discharge stack and fed along to make room for succeeding ones.

Upon completion of the advance of a loading of jacket members, the final ones may be discharged by introducing blank members, or by other suitable means; and the two exposed strip portions are then removed from the apparatus for development and, in the case of individual collocated photographs, for printing, the finished documents, as checks with voucher, being designed for delivery to the proper payee, while the individualized portions of the other strip may be filed and/or enlarged photographically or printed to afford the desired distributed accounting information and reports.

The nature of the invention, however, will best be understood when described in connection with the accompanying drawings, in which:

Fig. 1 is a longitudinal section through the novel apparatus.

Figs. 2 and 3 are transverse sectional views taken respectively on the lines 2—2 and 3—3, Fig. 1, and looking in the direction of the arrows.

Fig. 6 is a view in isometric projection of the novel apparatus.

Fig. 7 is a plan view, with portions broken away, of the novel jacket member for carrying data-bearing slips.

Fig. 8 is an exploded transverse sectional view of the jacket member, taken on the line 8—8, Fig. 7, and looking in the direction of the arrows; and Fig. 8a is a view similar to Fig. 8 but with the parts compacted and showing also a number of the data-bearing slips in place.

Fig. 9 is a wiring diagram illustrating the electrical control arrangement for effecting the exposure timings.

Figure 1:
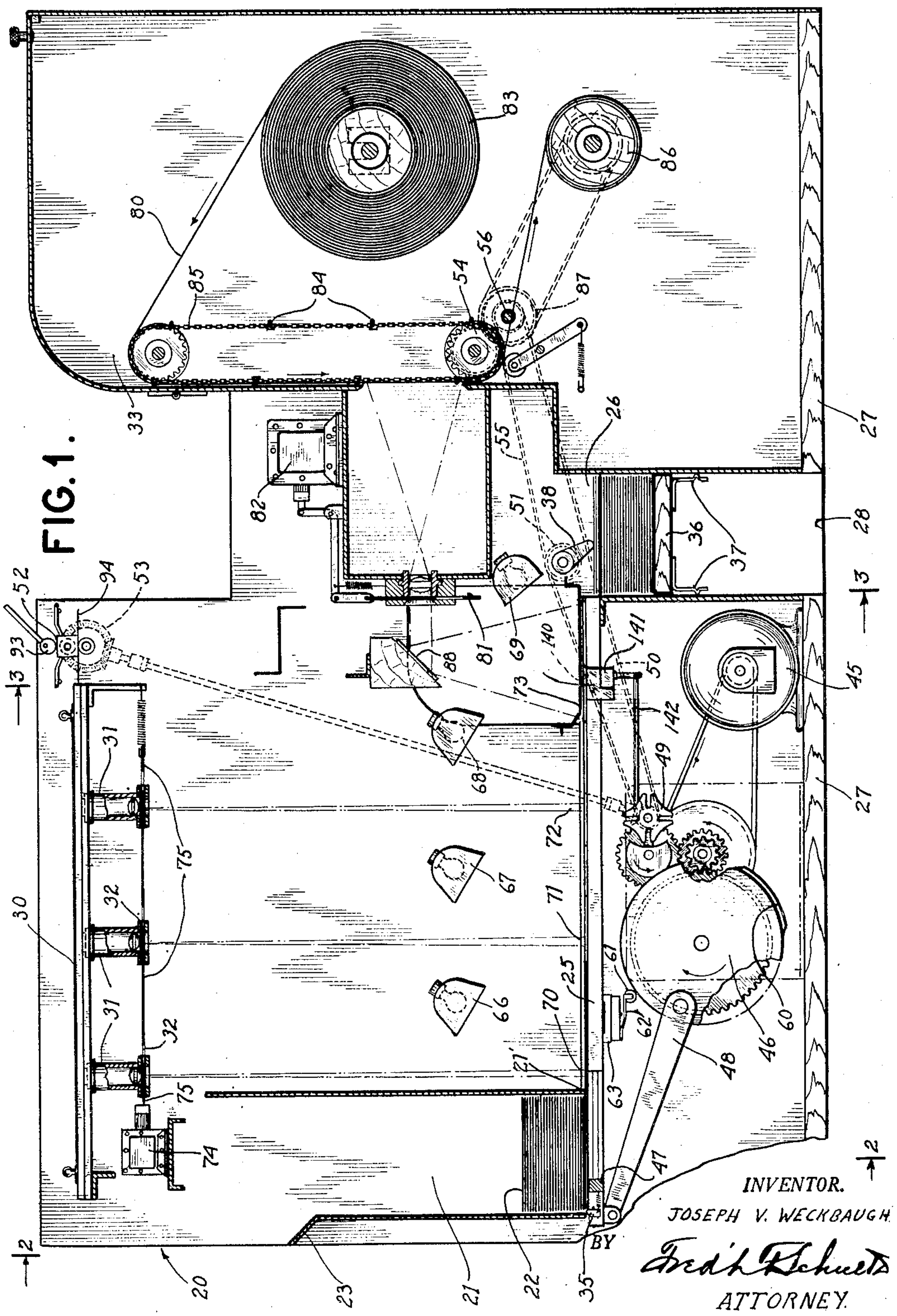
Figures 2, 3:
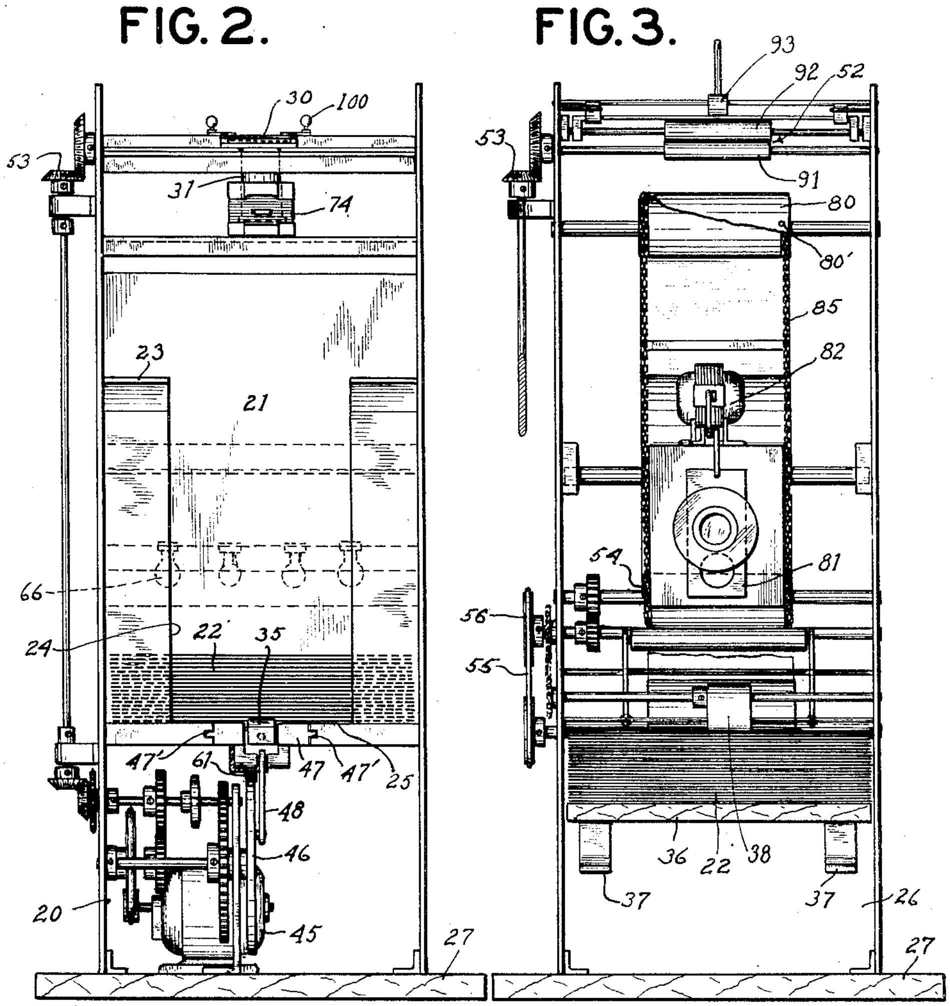

Referring to the drawings, more especially Figs. 1 and 6, 20 designates a suitable narrow housing which is open at the front to afford a loading stack element 21 open at the top to receive a succession of jacket members 22, hereinafter more fully described. The upper end of the said stack element is provided with out-turned lips 23 serving as guides in feeding said jackets into the stack, a slot 24, also, being provided in the front wall of said stack to expose a group of jackets stored therein, as shown. Provision is made to feed through a slot 21′ these jackets individually forward from the stack in a common plane, as over a platform or the like 25, toward the middle portion of the housing where they are consecutively received by a further stack element 26 for discharge thereinto and through the base 27 of the apparatus which is provided to this end with a discharge opening 28 through which the jackets may be removed manually.

In passing the jackets over said platform 25, which is accomplished intermittently, provision is made to photograph simultaneously, during intervals of rest in the progression of said jackets, a group comprising a predetermined number of adjacently disposed jackets, the photographs being made as shown on selected independent portions, for example, of a section of an intermittently advancing sensitized strip held within a light-sealed pack 30 located in the upper portion of the apparatus and associated with lenses 31 provided with ganged shutter means 32 automatically controlled. It will be understood that the said jackets carry the desired data as upon slips previously inserted therein, all as hereinafter more fully set forth. After this simultaneous and selective photography of a group, each jacket thereof is individually photographed by further camera means located within a light-sealed portion 33 of the casing at the far end thereof.

The stacked jackets 22 are removed one by one from the bottom of the stack 21, the lowermost jacket of a column being designed to be advanced over the platform 25, for example, by being engaged along its rear edge by a reciprocable finger or the like 35 which locates the jacket upon the platform 25, to be engaged then at its rear edge by the front or advancing edge of a subsequently introduced jacket as the latter is advanced similarly from the loading stack 21. This action continues to provide upon the platform 25 a predetermined number or group of jackets, whereupon the next advance operation will cause the furthermost jacket to be deposited over the discharge stack element 26, for example, upon a depressible platform 36 thereof having spring supports 37 extending from its lower face against opposite walls of the said stack element. The platform 36 is designed to be mechanically depressed by means of a rotatable finger 38 acting upon the top face of a jacket located on said platform.

A driving motor 45 mounted on the base 27 is provided to impart, through intermediate mechanism, the advancing movement intermittently to finger 35, for example, by means of the crank wheel 46 connected to a member 47 through a connecting rod 48, said member 47 reciprocating in ways 47′ and picking up a jacket member to advance it edgewise into the photographic fields. Finger 35 is pivotally mounted on member 47 so that on its return it rotates below the plane of the jacket member stack 21 so as to clear the said stack. At the end of the return stroke, the finger is sufficiently clear of the stack to rotate back into its original position to pick up and advance the next jacket member. The motor 45 drives simultaneously also the finger 38 for depressing platform 36, as through the Geneva movement 49 and chain 50 about a sprocket 51 of the shaft of said finger, as well as driving the advancing mechanism 52 for the sensitized strip in pack 30, through intermediate mechanism 53; also, the advancing mechanism 54 for the camera means within the casing portion 33, through an additional chain 55 and a sprocket 56.

The advance of the jackets and the several sensitized strips are thus synchronized as are also the shutter operations of the respective cameras, the latter operations being effected electrically but under control of said single driving motor 45. For example, reference being had to Figs. 1 and 9, the motor 45 is caused to operate a rotatable cam element 60 of the crank wheel 46, upon the periphery of which rides a roller 61 of a contact-operating, pivoted arm 62 controlling the operation of a contact switch indicated at 63 and included in the power circuit 64 from a source of power 65 which feeds, also, a predetermined number of groups of lamps represented at 66, 67, 68 and 69 and corresponding in number to the exposures to be effected of jackets upon platform 25. Thus, the first three lamp groups 66, 67 and 68 serve to provide the illumination of the respective fields 70, 71 and 72 for the grouped photography, in the present instance, of three jackets; while the lamp group 69 serves to illuminate the field 73 for the photography of a single jacket.

These lamps remain permanently energized during operation of the motor 45, the respective exposures of the sensitized strips being subject to the opening simultaneously, in the former instance, of the three ganged shutter mechanisms 32, associated with the lenses 31, through the energization of a solenoid 74 common thereto and connected to the shutter mechanisms by a spring-drawn rod 75. The solenoid 74, in turn, is rendered operative only when the dwell portion of the cam element 60 engages the roller 61, the timing being such that the exposures occur only during the period when a group of jackets is at rest upon platform 25.

Similarly, the exposure of a portion of a sensitized strip 80, of the camera means within the light-sealed portion 33, is effected only when a jacket is at rest and in the furthermost position 73 on the platform 25, a shutter 81 to this end being controlled by a further solenoid 82, located in the power circuit 64, through intermediate mechanism to open temporarily said shutter when the solenoid is energized.

Figures 10, 11, 12, 13:
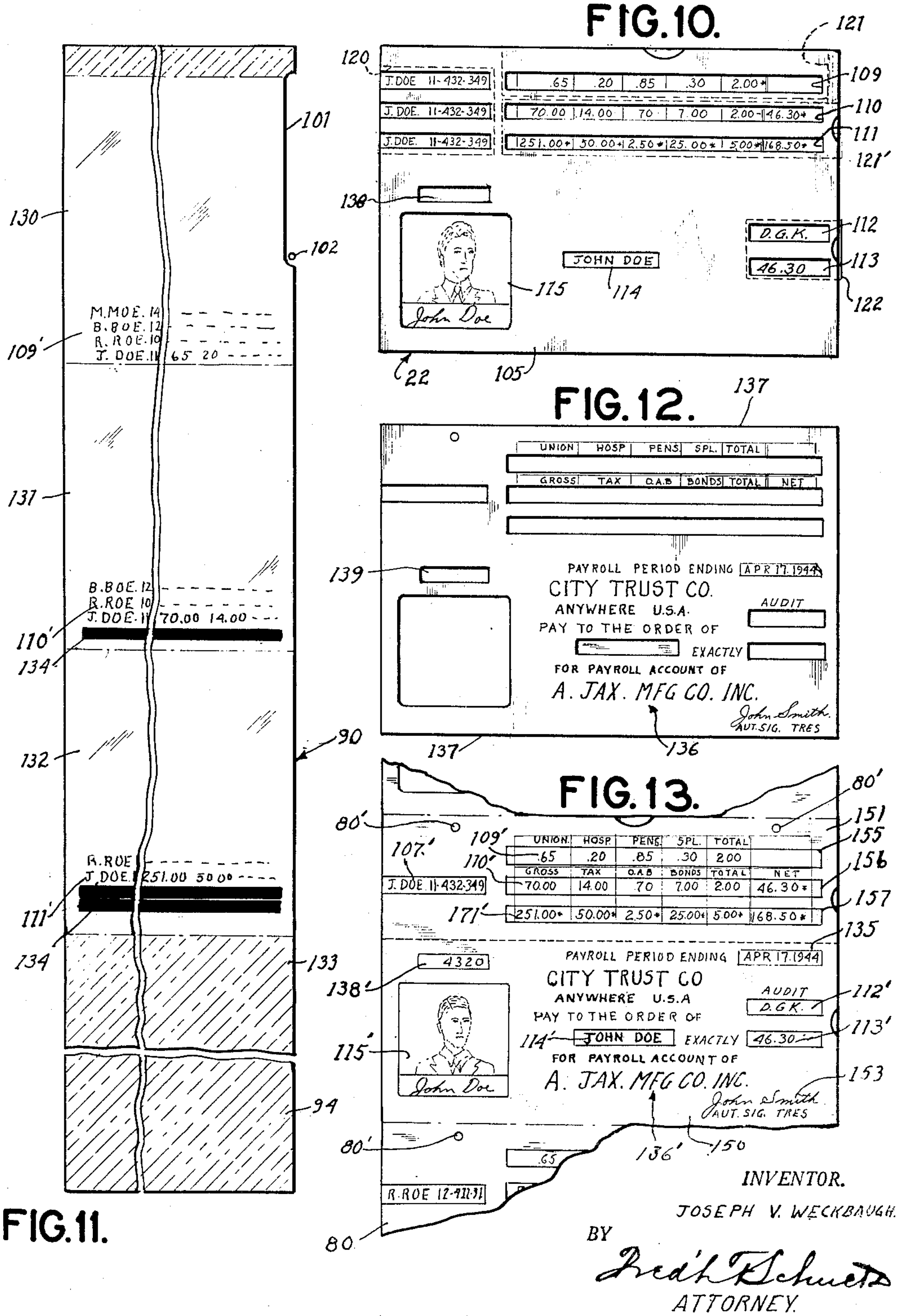
Fig. 10 is a plan view of a jacket member loaded with data-bearing slips.
Fig. 11 is a plan view on an enlarged scale of one of the sensitized strips fully exposed, and illustrates the disposition of the data thereon.
Fig. 12 is a plan view of a masking member designed to be superposed with respect to a jacket member when photographing the same upon a section of another sensitized strip from which the documents with vouchers are derived.
Fig. 13 is a plan view of a prepared document, specifically a check with attached voucher.

The sensitized strips in both instances are fed intermittently to correspond to new jackets to be photographed and appearing in the respective fields; and, in the case of the photography of a single jacket, the strip may be taken from a reel 83, said strip having lateral perforations 80', Fig. 13, for engagement with pairs of projections or teeth 84 of endless chains 85 so as to withdraw at each advance a predetermined length from the reel and present it in the optical system for exposure when the shutter 81 is opened.

After exposure, the strip is wound upon a take-up spool 86 connected with the advancing mechanism 54 by a spring belt and pulley 87 to be driven in synchronism with the advance of said strip. In the optical system is included a mirror 88 to reproduce the matter as right-reading upon the strip 80.

The advance of the sensitized strip 90 in the pack 30 is effected from the mechanism 52 which comprises a power-driven roll 91 and a cooperating roll 92 movable toward the roll 91 through a manually operable cam roller 93 contacting therewith. By this expedient, a free end 94 of the piece of sensitized strip, projecting beyond the pack casing 30 through a light-sealed opening 94' therein, may be clamped between the rolls 91 and 92 and withdrawn intermittently from the pack when the mechanism is actuated from the Geneva movement 49 to advance the strip through the pack a slight predetermined amount.

In loading the pack (under proper light conditions) with a length of sensitized strip 90, the same is provided in a longitudinal slotted carrier 95 having lateral guideways 96 along its inner edges for supporting the strip length, said length being ample to provide for sufficient advance to photograph a predetermined loading of jackets from the stack element 21, as well as to afford the external section 94 sufficient to enable the strip to be gripped between the rolls 91 and 92. This carrier is mounted, when thus loaded with sensitized strip, into the pack and overlaid with a longitudinal cover member 97 having a light-sealing fit therewith; and it is held in position therein by means of pairs of fingers 98 which are pivoted to the top of the pack and operated by being linked together by bars 99, one along each side. Knobs 100 projecting outwardly from the bars afford convenient means for manipulating the fingers to lock the carrier in the pack or to unlock it for removal therefrom, as for refilling.

Figure 4:
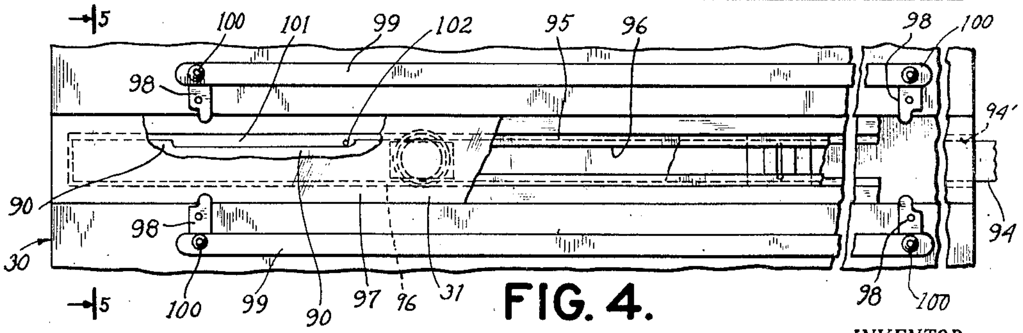
Fig. 4 is a fragmentary plan view, with portions broken away, of a sensitized strip holder or film pack used in the novel apparatus.
Figure 5:
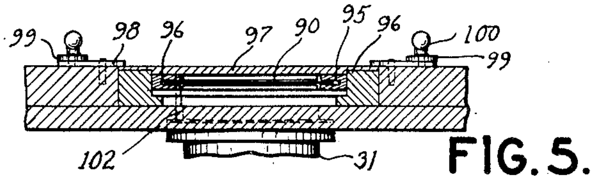
Fig. 5 is a transverse section through the strip holder, taken on the line 5—5, Fig. 4, and looking in the direction of the arrows.

The said pack carries, also, at its opposite face the appropriate lenses 31 with apertures which correspond in number to the number of fields provided for group photography of a predetermined number of jackets. The said sensitized strip, moreover, is notched along a lateral edge, as at 101, Figs. 4 and 11, to accommodate a stop pin 102 extending from the pack into the path of travel of the strip in order to prevent not only excessive withdrawal of a strip in clamping initially the external end thereof, but to limit within the capacity of the strip the number of consecutive exposures thereon.

A convenient form of the jacket member 22 is shown in Figs. 7, 8 and 8*a*, as well as in its loaded form, Fig. 10. As set forth, an upper plate 105 is provided with various slots such as the three parallel slots 106, 107 and 108 extending inwardly from one edge of the plate and similar but longer slots 109, 110 and 111 extending inwardly from the opposite edge and aligned with the respective said slots 106, 107 and 108. These slots are provided along the upper portion of the plate, corresponding to the stub or detachable portion of a document such as a check to be prepared by the use of a jacket member, as will hereinafter be more fully set forth. The lower portion of the plate is provided with additional slots 112 and 113 extending inwardly from an edge of the jacket member, as well as with depressions 114 and 115. It will be understood of course, that the various openings in the plate 105 are to be located and dimensioned to suit the particular matter to be reproduced. Such matter is to be provided in any suitable manner upon slips or a card or other inserts, as the inserts 120, 121, 121' and 122 designed to be held behind corresponding openings so that their data or indicia will be visible through a corresponding opening. In the apertures 114 and 115 are to be mounted cards or the like, in the particular embodiment herein set forth by way of example bearing the name of the payee and also a photograph of the payee with facsimile of his signature.

In order to maintain such insert elements in their proper location, there is provided behind the plate 105 an intermediate spacer member or plate 125 provided with various recesses 126, or rather, openings to accommodate the insert elements. Plate 125 in turn is backed by a backing plate 127 bearing on its inner surface and directed toward the openings 126, as well as to register therein, spring elements 128 which are designed to contact the unprinted or rear surface of an insert element and to press it over its margin firmly against plate 105 so as to maintain a proper positioning of the various insert elements in the jacket member, as is more clearly indicated in Fig. 8*a* of the drawings. The said plates may be secured to one another, for example, by means of a suitable adhesive After a jacket member 22 has thus been loaded by inserting from its edges the desired data-bearing insert elements for subsequent photography of the particular data, it is ready for insertion into the stack 21 to be advanced therefrom over the platform 25 and finally discharged into the discharge stack 26. During its intermittent advance over the said platform 25, as hereinbefore set forth, a group of the adjacently disposed jacket members is simultaneously photographed to register upon the sensitized strip 90 the selected portions exposed through the various openings in the top plate 105 of the jacket member. This selection may conveniently be secured by adjusting or off-setting the camera fields of the various optical systems 31. For example, in the first position of a jacket member on the platform, the particular field of photography will be restricted to include only the matter visible through the opening of slot 106 and the aligned opening 109. When this jacket member attains the next position on the platform, only the matter presented through the opening 107 and aligned opening 110 will be photographed on the subsequent portion of the sensitized strip 90; and when in the third and final position, so far as photography on the strip 90 is concerned, only the matter presented through opening 108 and aligned opening 111 will be photographed, the camera fields having been displaced accordingly for representation of the matter appearing through the openings upon corresponding displaced portions along the said strip 90.

Such displacement is conveniently effected by substituting a different pack, as required.

As this strip is intermittently advanced synchronously with the movement of jackets over the platform there will be provided on the said strip over three different portions thereof a succession of groups of transversely located linear representations (Fig. 11) of the matter presented through openings of consecutively presented jacket members until the limit of the strip portions has been reached. This limit may be secured by engagement finally of the stop pin 102 with the notched edge 101 of said strip. After the succession of linear representations, grouped in the three portions 130, 131 and 132 longitudinally of the strip 90, has been effected, the pack is opened by turning knobs 100 to release cover member 97 for admitting access to the strip for removal. This strip may then be developed and, if desired, also an enlarged print made therefrom; or, the matter may be projected.

In the use of the sensitized strip in the manner hereinbefore described, it will be appreciated that an outer or leader portion 133 corresponding in length to the advance of the strip as a whole as well as the portion 94 gripped by the advancing means, is without representations, though exposed, and may have identifying means (not shown) applied thereto, if desired. These waste portions may be constituted, also, of less expensive material than sensitized film and the like. Further short unused portions 134 corresponding to the displacements of the representations in each group result from the fact that exposures must initially be made in all locations as soon as the first jacket member of a succession is positioned in the first stage on the platform 25 and, also, when clearing the platform of active jacket members, for example, by following the same with blanks.

In its final or fourth stage of progression over the platform 25, a single jacket member is designed for photography in a further and independent field on the sensitized strip 80, in which case matter displayed through the openings 112 and 113 and retained in the depressions 114 and 115 is photographed in addition to the matter displayed through one of the openings 105, 106 and 107, displaying like data, and a corresponding one of the openings 109, 110 and 111. The latter matter will be photographed only on that portion of the strip 80 constituting the stub portion and separated from the remainder by a line of perforations 135 or other weakening means to allow of detaching the stub from the remainder of the document which constitutes a bankable check, a receipt or the like.

Numbering of the consecutive checks may be provided through further and registering openings 138 and 139 respectively in a jacket member 22 and masking member 137 in positioning the same over a window 140 of the platform 25 and beneath which is located a counter mechanism 141 of any well known type, the same being operated synchronously with the advance of the jacket member from the intermittently operating Geneva movement and intermediate mechanism 142.

In addition to the payable amount photographed on the check and the audit initials which are displayed through the openings 113 and 112, respectively, of the jacket, there is also photographed on said check, for example, the name of the payee and the picture of the payee and his signature, which are displayed at the depressions 114 and 115 of the said jacket member, to afford thereby a protected check. Other necessary matter to appear on the complete check, such as the matter 136, may be initially printed directly on the masking member 137 which serves also to display for exposure only the desired jacket matter as strip 80 advances into position, said masking member being supported over the platform 25 at the final location of a jacket member and interposed between the latter and the shutter 81 and having only registering openings corresponding to the desired matter to be photographed, as aforesaid. The lateral perforations 80′ are, preferably, provided in the stub portion of each photograph and may serve as filing openings for the stub when it is detached from the check portion.

A complete check with stub attached and prepared as hereinbefore described is shown in Fig. 13, the data 107′, 109′, 110′ and 111′; and 112′, 113′; also 114′, 115′ and 138′ having been derived from the corresponding openings 107, 109, 110 and 111; and 112, 113 and 138, and depressions 114 and 115 of a jacket member, while the matter 136′ was derived solely from the mask 137. Thus, the final document, photographically prepared on the strip 80 as hereinbefore set forth, comprises the check portion 150 and the detachable stub or vouched portion 151, the former serving as a bankable instrument bearing the usual matter 136′ and official facsimile signature 153 and the amount 113′ to be paid as well as the picture and facsimile signature 115′ of the payee. These two latter items assure proper identification and provide safeguards against fraud in cashing of a check. In addition, appropriate check numbers 138′ also appear.

In the particular form of document herein described by way of example, the amount payable 113′ thereon is derived from a computation disclosed in detail on the stub or voucher portion 151. As indicated, this voucher portion may bear one or more lines of indicia or data which may be ranged horizontally and in vertical columns. The particular arrangement shown indicates three lines lengthwise of the stub, the uppermost one 155 bearing items relative to payroll which are fixed and do not change from pay period to pay period. These items are such as are associated with union dues, hospitalization, pension fund, etc., and are regularly deductible. The intermediate line 156 bears payroll items which vary during each pay period being, for example, items withheld such as withholding tax, old age benefits, bond payments, etc., and generally computed on a percentage basis. The lowermost line 157 bears an accumulation of the columns in the preceding lines provided by carrying forward each pay day the amount of the preceding pay day added to the accumulated deductions from pay so that the payee is kept informed of the total amounts paid to him, both gross and net, and the specific totals of the allocated deductions, each of which is identified by suitable columnar headings. Thus, the first column shows the gross amount earned and the last column the net amount actually received and being the amount transferred to and indicated upon the check portion 150. The intermediate columns afford the totals of the several deductible items.

The payee's social security number is indicated at 107′, for example in the intermediate line 156 at one end.

I claim:

1. In apparatus of the nature set forth: a housing affording an open top loading stack for the reception of data-bearing jacket members to be superposed therein, said stack being provided at the bottom with a lateral slot to pass a single jacket, a platform in the plane of the slot and located immediately adjacent the same to receive and support for advancement a plurality of jacket members, said housing affording a further stack for discharge of jacket members from the opposite end of the platform, the discharge stack having an opening substantially in the plane of said platform to receive jacket members moved thereover; intermittently operating means adapted for engagement with jacket members at the bottom of the loading stack to advance the same through its lateral slot onto the platform and toward the discharge stack; photographic means to photograph simultaneously selected portions from a predetermined number of data-bearing jacket members positioned upon the platform; additional photographic means to photograph selected portions from an individual jacket member in another position on the said platform; and driving means for actuating the jacket member advancing means and both of the photographic means, together with timing means driven thereby for controlling the actuation of both of the photographic means during intervals of rest of jacket members upon the platform.

2. Apparatus according to claim 1, wherein a first sensitized strip is associated with the first-named photographic means, and a second sensitized strip is associated with the second-named photographic means, and respective means actuated from the driving means are provided to advance both of the said strips intermittently and synchronously with the advance of the jacket members over the platform.

3. Apparatus according to claim 1, wherein a first sensitized strip is associated with the first-named photographic means, and a second sensitized strip is associated with the second-named photographic means, and respective means actuated from the driving means are provided to advance both of the said strips intermittently and synchronously with the advance of the jacket members over the platform, and the first photographic means comprises an optical system including a plurality of lenses with gang shutter mechanism, said lenses being directed toward the platform to different portions thereof adjacently disposed in the sense of the direction of advance of jacket members thereover, the effective fields of respective lenses being progressively displaced from one another; and a means is provided for actuating the shutter mechanism of said lenses to open the same simultaneously for exposing corresponding portions of the said first sensitized strip.

4. Apparatus according to claim 1, wherein a first sensitized strip is associated with the first-named photographic means, and a second sensitized strip is associated with the second-named photographic means, and respective means actuated from the driving means are provided to advance both of the said strips intermittently and synchronously with the advance of the jacket members over the platform, and the first photographic means comprises an optical system including a plurality of lenses with gang shutter mechanism, said lenses being directed toward the platform to different portions thereof adjacently disposed in the sense of the direction of advance of jacket members thereover, the effective fields of respective lenses being progressively displaced from one another; an electrically operated means is provided for actuating the shutter mechanism of said lenses to open the same simultaneously for exposing corresponding portions of the said first sensitized strip, and the second photographic means comprises an optical system including a single lens with shutter mechanism, said lens being directed toward the platform to a further portion thereof in the direction of advance of jacket members thereover; and an electrically operated means is provided for operating the shutter mechanism of said single lens to open the same simultaneously with the actuation of the gang shutter mechanism of said plurality of lenses for exposing a portion of the said second sensitized strip to a complete jacket member advanced into its final location and into the field of said single lens.

5. Apparatus according to claim 1, wherein a masking means is located over the position for photographing a said individual jacket member.

6. In apparatus of the nature set forth: a platform to receive data-bearing jacket members; means adapted for operative engagement with successive jacket members to advance in a common plane a group of the same over the platform; photographic means including a plurality of optical systems focussed upon respective limited field portions through which the jacket members are advanced, said optical systems being displaced from one another in accordance with the order of the respective data of a jacket member and adapted to photograph selected portions from data-bearing jacket members on the platform and relatively displaced in the direction of progression of said members; driving means for actuating the jacket advancing means; and timing means actuated by the driving means for controlling the operation of the respective photographic means during intervals of rest of the jacket members upon the platform.

JOSEPH V. WECKBAUGH.

REFERENCES CITED

The following references are of record in the file of this patent:

UNITED STATES PATENTS

| Number | Name | Date |
|---|---|---|
| 772,342 | Cummings | Oct. 18, 1904 |
| 1,567,156 | Lohff | Dec. 29, 1925 |
| 1,742,658 | Loening | Jan. 7, 1930 |
| 1,767,414 | Strapp | June 24, 1930 |
| 1,801,450 | Owens | Apr. 21, 1931 |
| 1,833,433 | Opitz | Nov. 24, 1931 |
| 1,836,038 | Owens | Dec. 15, 1931 |
| 2,037,764 | Daneker | Apr. 21, 1936 |
| 2,073,304 | Hopkins | Mar. 9, 1937 |
| 2,257,444 | Abadjieff | Sept. 30, 1941 |
| 2,364,188 | Bryce | Dec. 5, 1944 |
| 2,357,674 | McConnell | Sept. 5, 1944 |